Figure 1:
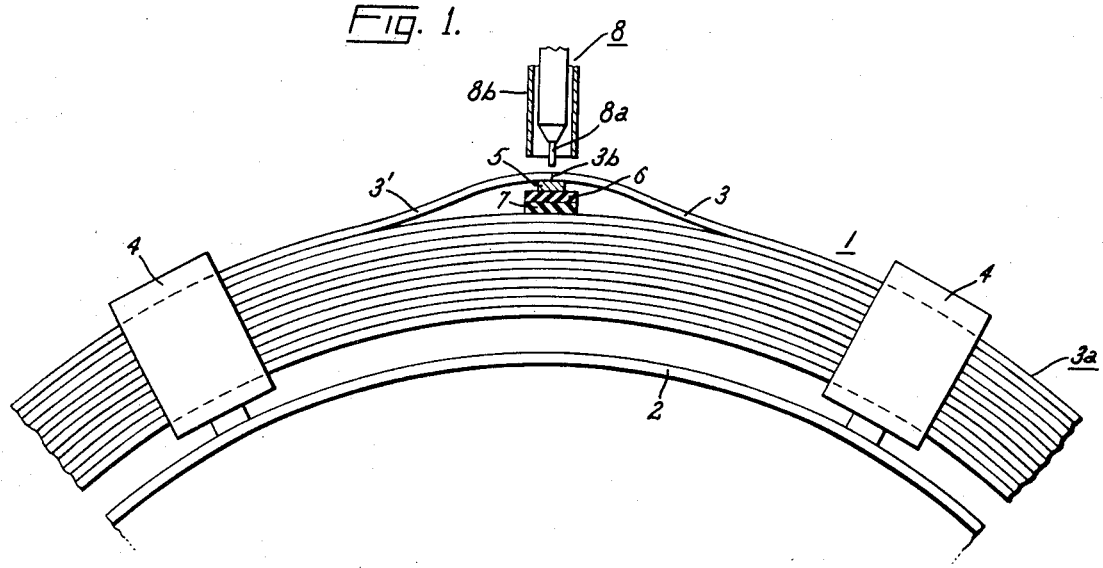

United States Patent [19]
Hall

[11] 3,735,088
[45] May 22, 1973

[54] BRAZING METHOD AND APPARATUS

[75] Inventor: Homer H. Hall, Rome, Ga.

[73] Assignee: General Electric Company

[22] Filed: Mar. 8, 1971

[21] Appl. No.: 121,685

[52] U.S. Cl. .................... 219/85, 219/117, 219/137
[51] Int. Cl. .............................................. B23k 1/04
[58] Field of Search .................. 219/85, 117, 91, 219/137, 130

[56] References Cited

UNITED STATES PATENTS

| 3,541,673 | 11/1970 | Cushman | 29/491 |
| 2,206,375 | 7/1940 | Swift | 219/137 |
| 2,768,271 | 10/1956 | Meredith | 219/85 |
| 3,601,573 | 8/1971 | Shutey | 219/85 |

Primary Examiner—J. V. Truhe
Assistant Examiner—L. A. Schutzman
Attorney—Sidney Greenberg, J. Wesley Haubner, Frank L. Neuhauser, Oscar B. Waddell and Joseph B. Forman

[57] ABSTRACT

Joints in copper wire of electrical coil windings are brazed by applying a tungsten inert gas (TIG) torch on the upper side of the joint with a braze alloy arranged on the under side. A thermal shield, such as superposed asbestos and mica sheets, is arranged between the braze alloy and the underlying coil windings to protect the windings from the heat of the brazing process.

8 Claims, 2 Drawing Figures

PATENTED MAY 22 1973

3,735,088

INVENTOR:
HOMER H. HALL,
BY Sidney Greenberg
ATTORNEY

BRAZING METHOD AND APPARATUS

The present invention relates to a metal brazing process, and more particularly concerns the method of brazing joints in conductive windings of electrical coil, such as transformer coils.

In joining coil windings for transformers, such as in making interlace windings, butt joints are preferred in order to minimize the possibility of radial overbuild of the coil. In known methods for brazing such joints, electrical resistance heating or torch heating procedures have been used, but the prior methods have entailed the risk of unduly heating and consequently damaging adjacent coil windings when the joint to be brazed is located at the coil surface. When the windings are composed of electrolytic copper, particular difficulties are encountered with prior methods because of the possibility of oxidation with resultant embrittlement of the copper due to the air atmosphere, the arrangement or the nature of the braze alloy, the manner in which the joint is heated, or for other reasons.

It is an object of the invention to provide an improved metal brazing method and apparatus.

It is a particular object of the invention to provide an improved method and apparatus for making brazed joints in copper members, and especially in coil windings formed of electrolytic copper wires.

Still another object of the invention is to provide a method of making joints in coil windings of the above type wherein the joints are brazed in proximity to the remainder of the coil winding while protecting the coil winding from adverse effects of the brazing procedure.

Other objects and advantages will become apparent from the following description and the appended claims.

With the above objects in view, the present invention in one of its aspects relates to a method of making a brazed joint between copper wire members which comprises arranging braze alloy filler material at one side of the joint, heating means such as an electric-arc torch at the opposite side of the joint, and thermal shield means adjacent the braze filler material on the side thereof remote from the joint, and heating the copper wire members at the joint with the electric-arc torch while melting the braze filler material, whereby the latter material is drawn into the joint for forming a brazed joint between the copper wire members.

Figure 2:
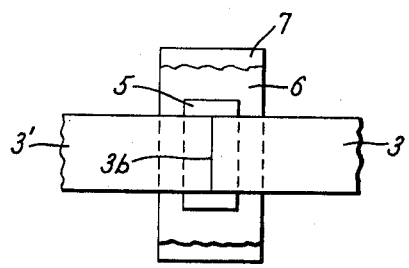

The invention will be better understood from the following description taken in conjunction with the accompanying drawing, in which:

FIG. 1 is an elevational view, partly in section, showing brazing apparatus arranged for brazing a butt joint in accordance with the invention; and FIG. 2 is a top plan view of a portion of the FIG. 1 arrangement showing the joint with associated braze filler material and thermal shield members.

Referring now to the drawing, and particularly to FIG. 1, there is shown a portion of a transformer coil 1 comprising an insulating cylinder 2 on which rectangular conductive wire 3 is wound on itself in the form of a coil winding 3a, with spacer members 4 holding the coil spaced from the surface of supporting cylinder 2. The wire 3 is typically composed of a highly electrically conductive metal such as electrolytic copper.

In the manufacture of electrical coils of the type illustrated, it is often necessary to make connections between portions of the coil winding, such as shown in the drawing, e.g., in making interlace windings. In accordance with an embodiment of the invention, a butt joint 3b between wire members 3, 3' is made at the surface of the coil by the means shown and described more fully below.

On the under side of butt joint 3b, a block of braze filler material 5 is placed in contact with the joint and supported in that position spaced from the adjacent coil surface by superposed pads or sheets of asbestos 6 and mica material 7 which serve the dual function of a composite electrically insulating thermal shield and support for braze filler 5.

Arranged on the upper side of butt joint 3b is a welding torch 8 shown in fragmentary form, and in the illustrated embodiment welding torch 8 is of the electric-arc type having a non-consumable electrode 8a surrounded by a nozzle 8b through which an inert gas such as argon flows for providing a curtain of inert gaseous atmosphere around electrode 8a and around the joint area as the electric arc is maintained between electrode 8a and joint 3b in the brazing operation. Such a welding torch 8 may typically be a tungsten inert gas (TIG) torch of well-known type, as disclosed, for example, in U.S. Pat. No. 3,524,039 and the Union Carbide Corp. publication there cited. As will be understood, both wires 3 and 3' adjacent butt joint 3b will have suitable ground connections (not shown) for enabling the electric arc to be established between the torch and the work.

The TIG welding torch described has been found eminently satisfactory for use in practicing the present invention, particularly since such a heating device provides a relatively concentrated heat source and, accordingly, when used in conjunction with a thermal shield as disclosed herein, it reduces the risk of damage to the coil winding in proximity to the brazed joint. However, other types of known torch or other heat producing devices may be found suitable for the purposes intended, it being noted that torch devices which produce or involve the use of gases which include reducing agents such as hydrogen should not be employed, so as to avoid embrittlement of the work piece.

Thermal shield member 7 arranged adjacent the coil surface is preferably a mica material, such as natural mica or a mica material marketed under the trademark Isomica and constituted by built-up Muscovite sheet mica impregnated with a suitable binder such as epoxy resin, silicon resin, shellac, or other material. The asbestos thermal shield component 6 is placed adjacent braze material 5 because asbestos under elevated temperature conditions will not produce undesirable gases or other pollutants which might adversely affect the molten braze material, such as the mica-binder composition might. Also, the texture of the asbestos member 6 is such that it more effectively holds the braze filler alloy in proper contact with the joint to be brazed. On the other hand, the mica-containing member 7 is used because it is superior to asbestos as a thermal shield and provides more adequate protection against damage to the underlying coil windings as a result of the brazing process. In a typical arrangement, asbestos member 6 may be about 1/16 inch thick and mica member 7 about 6 mils thick.

A composition of braze filler 5 which has been found satisfactory for use in the described method is a copper alloy containing about 5 percent silver as a wetting agent and about 6 percent phosphorus as a fluxing agent, and having a melting point of about 1,200° F. Another satisfactory brazing alloy which may be employed is composed of copper and about 7 percent phosphorus. It will be understood, however, that various other known or suitable braze alloy compositions may be employed in practicing the invention, providing, of course, that the alloy used has a melting point below that of the metal members to be joined.

The placing of the braze alloy material 5 on the side of the joint opposite the heating torch is a significant feature of the invention, in that by virtue of such an arrangement, the molten braze material is protected from the arc of the TIG torch, which, if it directly contacted the alloy, would adversely affect its properties and result in a poor joint.

With the apparatus arranged as shown in the drawing, the brazing process is carried out simply by establishing an arc from the TIG electrode 8a to the work joint 3b with the inert gas flowing from nozzle 8b to provide a curtain around the electrode and around the joint area, whereby the adjoining copper wire ends are suitably heated and the braze alloy becomes molten. The molten alloy is drawn into the joint by capillary action, and when it has uniformly filled the joint, the torch is extinguished, the parts allowed to cool, and the thermal shield pads are removed.

While the brazing process has been described herein with respect particularly to a butt joint, it will be evident that the advantages of the invention may also be obtained in making other types of joints, such as lap joints, flange joints, corner joints, etc.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. The method of making a brazed joint between elongated metal members arranged with end edges in contact with one another in a butt joint, which comprises arranging braze filler material entirely at one side of said butt joint, heating means at the opposite side of said butt joint so that said butt joint is arranged between said braze filler material and said heating means, and combined thermal shield and support means adjacent said braze filler material on the side thereof remote from said butt joint, and heating said metal members at said butt joint with said heating means while melting said braze filler material and while drawing the latter material into said butt joint by capillary action for forming a brazed joint between said metal members.

2. A method as defined in claim 1, said heating means comprising electric-arc torch means, said metal members comprising copper members, and said thermal shield means being electrically insulating.

3. A method as defined in claim 2, said electric-arc torch means comprising a non-consumable electrode arranged within a curtain of inert gas, said copper members comprising electrolytic copper wires.

4. A method as defined in claim 3, said joint being adjacent the surface of a coil winding, said thermal shield means being arranged on said coil winding surface.

5. A method as defined in claim 2, said braze filler material comprising a copper alloy.

6. The method of making a brazed joint between metal members which comprises arranging braze filler material at one side of said joint, heating means at the opposite side of said joint, and thermal shield means adjacent said braze filler material on the side thereof remote from said joint, and heating said metal members at said joint with said heating means while melting said braze filler material whereby the latter material is drawn into said joint for forming a brazed joint between said metal members, said heating means comprising electric-arc torch means comprising a non-consumable electrode arranged within a curtain of inert gas, said metal members comprising electrolytic copper wires, said joint being adjacent the surface of a coil winding, said thermal shield means being electrically insulating and arranged on said coil winding surface, said thermal shield means comprising superposed sheets of asbestos material and mica material, said asbestos sheet material arranged adjacent said braze filler material and said mica sheet material arranged adjacent said coil winding surface.

7. The method of making a brazed joint between metal members which comprises arranging braze filler material at one side of said joint, heating means comprising electric-arc torch means at the opposite side of said joint, and electrically insulating thermal shield means adjacent said braze filler material on the side thereof remote from said joint, and heating said metal members at said joint with said heating means while melting said braze filler material whereby the latter material is drawn into said joint for forming a brazed joint between said metal members, said metal members comprising copper members, said braze filler material comprising a copper alloy containing minor amounts of silver and phosphorus.

8. Apparatus for brazing a joint between metal members comprising, in combination, heating means comprising electric-arc torch means arranged on one side of said joint for heating the same, braze filler material arranged at the opposite side of said joint, and electrically insulating thermal shield means arranged adjacent said braze filler material on the side thereof remote from said joint, said metal members comprising electrically conductive wires and said joint thereof being located adjacent the surface of a coil winding, said electric-arc torch means comprising a non-consumable electrode arranged within a curtain of inert gas, said thermal shield means comprising superposed sheets of asbestos material and mica material, said asbestos sheet material arranged adjacent said braze filler material and said mica sheet material arranged adjacent said coil winding surface.

* * * * *